United States Patent [19]

Ecklund

[11] Patent Number: 4,944,011

[45] Date of Patent: Jul. 24, 1990

[54] CIRCUIT FOR CONTROLLING OPERATOR INDICATORS IN AN AM STEREO RECEIVER

[75] Inventor: Lawrence M. Ecklund, Wheaton, Ill.

[73] Assignee: Motorola, Inc., Schaumburg, Ill.

[21] Appl. No.: 87,839

[22] Filed: Aug. 21, 1987

[51] Int. Cl.$^5$ .............................................. H04H 5/00
[52] U.S. Cl. ........................................ 381/15; 381/12; 455/154
[58] Field of Search ....................... 455/154, 155, 153; 381/15, 16, 12

[56] References Cited

U.S. PATENT DOCUMENTS

| | | | |
|---|---|---|---|
| 3,416,032 | 3/1966 | Jahns et al. | 315/149 |
| 3,717,817 | 2/1973 | Auerbach | 381/155 |
| 4,218,586 | 8/1980 | Parker et al. | 179/1 GS |
| 4,236,041 | 11/1980 | Thomas | 381/12 |
| 4,405,837 | 9/1983 | Ecklund | 179/1 GS |
| 4,409,436 | 10/1983 | Numata et al. | 381/15 |
| 4,503,397 | 3/1985 | Schultz | 381/12 |
| 4,602,379 | 7/1986 | Ecklund | 381/12 |
| 4,688,254 | 8/1987 | Ecklund . | |
| 4,694,501 | 9/1987 | Cheng | 381/15 |
| 4,747,141 | 5/1988 | Kahn | 381/15 |

FOREIGN PATENT DOCUMENTS 0062590 10/1982 European Pat. Off. ............ 455/154
53-5901 1/1978 Japan ................................... 455/155

OTHER PUBLICATIONS

LB8-1 (National Semiconductor, 1969).
AN 20-8,9 (National Semiconductor), 1969.

*Primary Examiner*—Forester W. Isen
*Attorney, Agent, or Firm*—Wayne J. Egan

[57] ABSTRACT

Disclosed is a circuit for controlling the activation of a stereo indicator and a tune indicator in an AM stereo receiver. In the preferred embodiment, a pilot tone detector is employed to determine if the input signal is a stereo signal and an AGC is used to detect a preselected improvement in the amplitude of the received signal. A capacitor is charged in response to the stereo or the amplitude condition. When the charge level of the capacitor reaches a first predetermined level, a tune indicator driver is enable to allow a tune detect circuit to drive the indicator. This prevents the tune indication from activating before the receiver is stabilized. When the charge level of the capacitor reaches a second predetermined level, a stereo indicator driver gradually activates the stereo indicator. This prevents sudden power drains from adversely affecting the circuit.

16 Claims, 1 Drawing Sheet

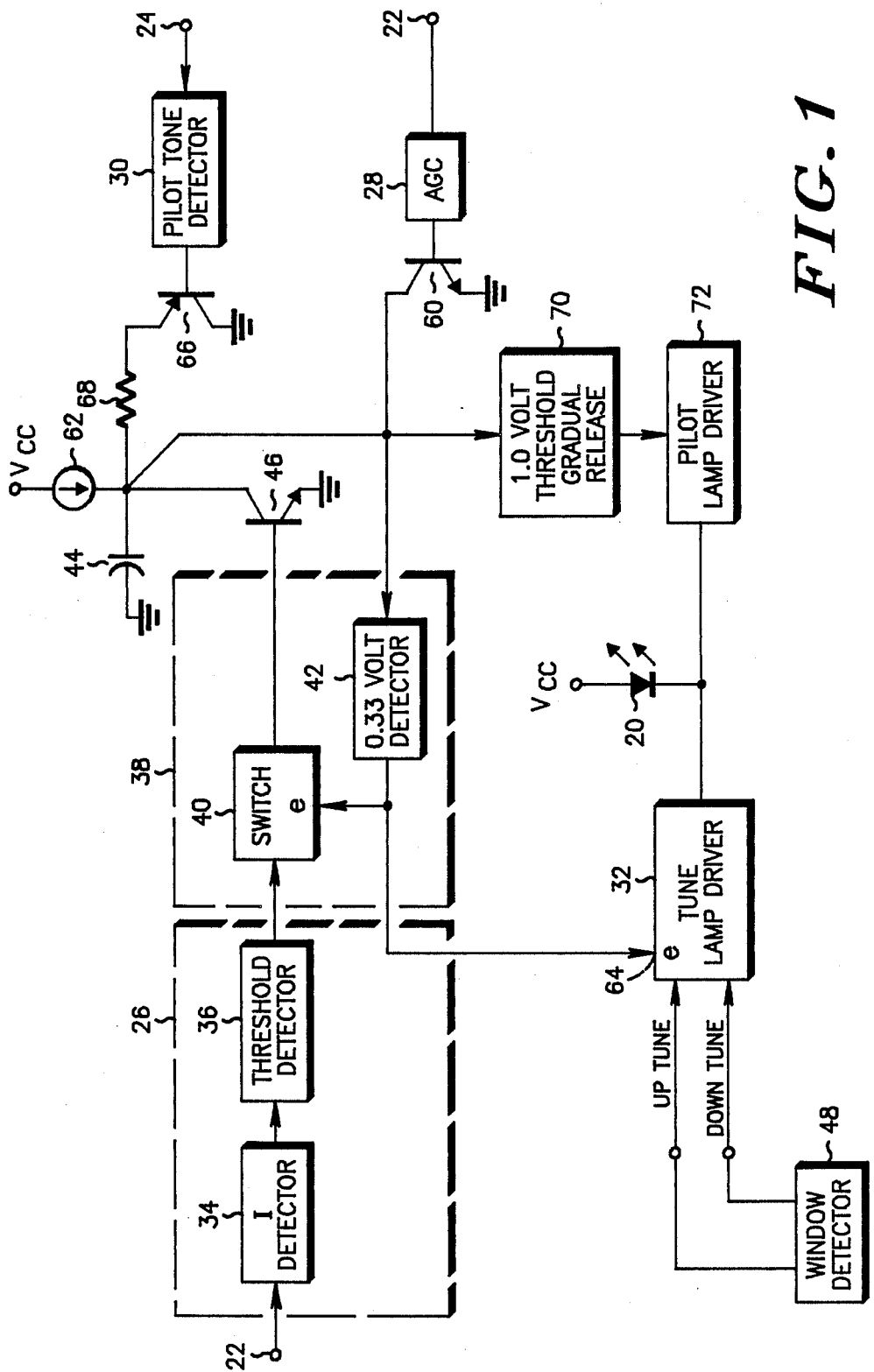

CIRCUIT FOR CONTROLLING OPERATOR INDICATORS IN AN AM STEREO RECEIVER

FIELD OF THE INVENTION

The present invention relates generally to radio wave receivers, and, more particularly, to control circuitry for an operator indicator in an AM stereo receiver.

DESCRIPTION OF THE PRIOR ART

AM stereo receivers typically include Light Emitting Diodes (LEDs) for indicating when the receiver is tuned to a station and when the receiver is tuned to a stereo signal. Such indicating has been accomplished by either providing different levels of brightness in a single LED or by providing a dedicated LED for each indication. In either case, in some instances known implementations have failed to accurately indicate such tuning functions. For example, consider the state of the receiver as it is being tuned from a first station to a second station, wherein the second station is 10 kHz above the first station. As the receiver is tuned away from the first station, the PLL forces the frequency of its local oscillator toward its lower limit. After the receiver falls out of lock with the first station, the second station is detected, and the frequency of the local oscillator must almost instaneously change to its upper limit as the receiver attempts to lock onto the second station. By suddenly changing the frequency of the local oscillator from its lower limit to its upper limit, the tune indicator circuitry is typically activated, and a false "tune" indication is provided to the operator. This can be extremely annoying when the operator is monitoring the indicator while attempting to locate a station.

The operator is similarly annoyed when an indicator is activated, whether a false or actual indication, and such activation causes audible "pops" through the speakers. This can occur in a battery supplied receiver as a result of sudden battery current drain when the (LED) indicator is activated. The sudden current drain causes a slight voltage drop in the battery level. Consequently, a change in the local oscillator can be detected as an instantaneous change in the amplitude of the received signal due to carrier movement in the IF. This may produce a slight "pop" in the speaker(s) if the oscillator movement is large enough.

This problem is especially prevalent when AM stereo is detected and indicated. The phase of the received signal is extremely critical to the operation of the stereo decoder. When a slight instantaneous change in the local oscillator frequency is detected by the stereo decoder, a very distinct audible "pop" is produced in the speakers.

Accordingly, there is a need for a circuit which overcomes the above mentioned shortcomings.

BRIEF DESCRIPTION OF THE DRAWINGS

The features of the present invention which are believed to be novel are set forth with particularity in the appended claims. The invention, with its objects and advantages, may best be understood by making reference to the following description taken in conjunction with the accompanying drawing, in which like reference numerals identify like elements, and wherein:

FIG. 1 is a circuit diagram of a current pump implementation for activating a "tune/stereo" LED, according to the present invention.

DETAILED DESCRIPTION OF THE PREFERRED EMBODIMENT

The circuit disclosed in this specification has particular use in radio receivers. More specifically, this circuit has applicability to AM stereo receivers for systems transmitting a signal which is represented by the following formula:

$$(1+L+R)\cos(w_c t+\phi)$$

where L and R are information signals, $w_c$ represents the carrier frequency and $\phi$ is the angle which is equal to $\tan^{-1}[(L-R)/(1+L+R)]$. This signal and the system employing it are described in U.S. Pat. No. 4,218,586, assigned to the same assignee, and incorporated herein by reference.

For such receivers, this circuit provides an operator indicator, such as a LED, to indicate to the operator whether the receiver is tuned to a station, and, if so, whether the station is generating an intelligible AM stereo signal.

FIG. 1 depicts a block diagram of an indicator control circuit in accordance therewith. The circuit includes an LED 20 to indicate whether the receiver is tuned to an AM station, and, if so, whether the receiver is receiving an intelligible AM stereo signal on the station.

Such indication is accomplished by driving the LED 20 at two brightness levels. The lesser brightness level is present when the LED is tuned to an AM station, but when no intelligible stereo signal is being received. The greater brightness level is present when the LED is tuned to an AM station and when an intelligible stereo signal is being received. When neither of these conditions are present, the LED 20 is not conducting any current, and thus no light is emitted therefrom. Such a LED driving arrangement is discussed more fully in U.S. Pat. No. 4,602,379, assigned to the present assignee and incorporated herein by reference.

While the output of the circuit in FIG. 1 is provided by the LED 20, the input to the circuit is essentially the receiver IF signal 22, or a component thereof 24. There are three blocks of circuitry which receive such inputs. These blocks include an automatic gain control (AGC) circuit 28, an excess I detector 26 and a pilot tone detector 30. Each block monitors the condition or quality of the input signal in order to control the voltage level at a lock capacitor 44. A clamping circuit 38 and a gradual release circuit 70 monitor the lock capacitor 44 voltage level so as to effectively delay the activation of the LED 20. This delay allows the receiver to stabilize so that the indicator (LED 20) will generate an accurate tuning indication and a stereo function which does not produce "pops" in the speakers.

The AGC circuit 28 employs the IF signal 22 to discharge the capacitor 44, through a transistor 60 whenever the AGC is set for maximum gain. Once the AGC detects a desired improvement in the condition, in this instance the amplitude, of the received signal, transistor 60 is turned off and the capacitor 44 is allowed to charge via a current source 62.

The excess I detector 26 receives the IF signal 22 to determine whether the receiver is out of lock or whether the I component of the AM signal has excessive noise present. If either of these conditions is present and there is at least 0.33 Volts at the lock capacitor 44, then a transistor 46 is activated to discharge the capacitor 44 such that it is substantially clamped to 0.33 volts. If neither of these conditions is present, then transistor 46 is non-active.

More particularly, the excess I detector 26 employs the IF signal to determine whether the receiver is in lock or whether the I component of the received AM signal exceeds the incoming reference by more than 10% in the negative direction. The excess I detector 26 employs an I detector 34, such as the detector described in U.S. Pat. No. 4,688,254, assigned to the same assignee and incorporated herein by reference, to develop an output signal which is indicative of "quality" of the I component. A threshold detector 36 receives the output signal from the I detector 34 to perform the 10% comparison against the reference. The output signal developed by the I detector 34 may be represented mathematically as:

$$(A\text{-cosine }\phi),$$

where A is the amplitude of the received signal, and $\phi$ is the phase difference between the received signal and the signal provided by the reference oscillator. The threshold detector 36 is essentially a differential amplifier which compares the amplitude of the received signal and $-10\%$ of the carrier of the received signal. Thus, the output signal of the threshold detector 36 is a binary signal indicating if the receiver is out of lock or if noise in the I component exceeds the above discussed $-10\%$ threshold.

The clamping circuit 38 is employed with a tune lamp driver 32 and a tune window detector 48, in response to the voltage at the capacitor 44, to to briefly delay the indication to the operator that the receiver is tuned to AM station. The tune lamp driver may be implemented as an enable to an AND gate wherein the inputs to the AND gate are the outputs of the window detector 48. The window detector 48 is discussed in detail in co-pending application "A Clamping Circuit for a PLL Tuning System," Ser. No. 061757, filed on 06/15/87, assigned to the same assignee and incorporated herein by reference. The operation of these blocks may best be described by analyzing the states of the circuit in FIG. 1 as the receiver becomes tuned to a station.

Initially, when no significant signal level is present, the tune window detector 48 is often "forced" to falsely indicate that the receiver is tuned. This may occur either through circuit design, as described in "A Clamping Circuit for a PLL Tuning System," supra, or as a function of tuning between stations (i.e., forcing the local oscillator from its lower frequency limit to its upper frequency limit as previously discussed).

Also, when no significant signal level is present, the AGC 28 is set for maximum gain and a transistor 60 is actuated to discharge the voltage at the lock capacitor 44.

As the receiver tunes closer to a station, the AGC 28 will no longer be set for maximum gain and the voltage at the lock capacitor will begin to charge. An enable input 64 to the tune lamp driver 32 prevents the tune indication to the operator from activating until the voltage at the capacitor 44 reaches 0.33 Volts. Without this delay, whenever the window detector 48 would appear to indicate that the receiver was tuned, the tune lamp driver 32 would activate the tune indicator (the LED 20) regardless of whether the receiver was actually tuned.

The enable input 64 to the tune lamp driver 32 is controlled by a 0.33 Volt detector 42. The input to the detector 42 is connected to the lock capacitor 44. After the detector 42 detects that the voltage at the capacitor 44 has increased to 0.33 Volts, two functions are initiated. First, the enable input 64 is activated to allow the window detector 48 to control the tune indication of the LED 20. As discussed above, this control allows the receiver time to stabilize (after the AGC circuit 28 releases from its maximum gain state) and prevents the tune indicator from falsely activating when the window detector has been "forced" to its tuned state.

The second function includes enabling the switch 40. With the switch 40 enabled, the excess I detector 26 controls the charge on the capacitor 44 through the transistor 46. With the switch 40 disabled, the transistor 46 is disabled and the capacitor 44 is allowed to charge so long as transistors 60 and 66 are not actively discharging. This enable/disable action effectively clamps the voltage at the lock capacitor 44 to 0.33 Volts whenever the excess I detector indicates that the receiver is not in lock or that excessive noise is present.

The pilot tone detector 30 receives the Q component of the IF signal 22 to determine whether the receiver is tuned to a stereo or a mono station. The stereo function and the detector 30 are described in U.S. Pat. No. 4,405,837, assigned to the same assignee and incorporated herein by reference. Essentially, stereo is present when a 25 Hz. tone is detected on the received signal. If the stereo function is not present, the output of the detector 30 is low and, presuming that transistors 46 and 60 are disabled (eg. the receiver is in lock), the emitter of a transistor 66 remains at a voltage level of approximately 0.6 Volts. Through proper selection of a resistor 68 connected to the emitter of transistor 66, the 0.6 Volts at the emitter maintains a voltage level of approximately 0.8 Volts at the capacitor 44. By maintaining 0.8 Volts at the capacitor 44, the LED 20 is prevented from reaching the brightness level which indicates that stereo is present.

When the pilot tone detector 30 detects stereo, the transistor 66 is disabled and the voltage of the capacitor 44 is allowed to charge up to 1.8 Volts (preferably a voltage level greater than 1.2 Volts). When the voltage at the capacitor 44 reaches approximately 0.9 Volts, a gradual release circuit 70 provides a linearly increasing output to a pilot lamp driver 72 which controls the brightness level of the LED 20. By providing the linearly increasing output to the pilot lamp driver 72, the LED 20 maximum brightness level (indicating that stereo is present) is effectively delayed for a brief period until the voltage at capacitor 44 reaches about 1.1 Volt. This effective delay of the maximum brightness level allows the pilot lamp driver 27 to slowly increase the brightness level of the LED 20 in order to prevent a sudden current drain from the power supply (eg. a battery), and, consequently, "pops" in the speakers.

The gradual release circuit 70 may be implemented using a low gain differential amplifier having two inputs, one of which is connected to a 1 Volt reference while the other input is connected to the capacitor 44. The collector output of the capacitor side of the amplifier is connected to the pilot lamp driver 72. The other collector output is connected to $V_{cc}$.

The pilot lamp driver may be implemented using a conventional amplifier using a low gain amplifier or current mirror.

What is claimed is:

1. In an AM stereo radio receiving an AM input signal, a circuit for controlling a stereo indicator, comprising:
   detection means for detecting that the input signal is a stereo signal; and
   driving means, responsive to the detection means, for gradually activating the visual stereo indicator,
   wherein the driving means includes a low gain amplifier which generates a gradually increasing signal in response to the detection means so as to prevent sudden power drains from affecting the circuit.

2. A circuit for controlling a stereo indicator, according to claim 1, wherein the driving means includes an indicator driver which increasingly drives the stereo indicator in response to the low gain amplifier.

3. In a radio receiver system receiving an input carrier signal, a circuit for controlling an operator indicator, comprising:
   detection means for detecting a preselected improvement in the carrier signal condition of the received signal;
   threshold means, responsive to the detection means, for monitoring the improvement in the carrier signal condition of the received signal;
   delay means, responsive to the threshold means, for effectively delaying the activation of the operator indicator for a predetermined period of time to prevent a false indication of said improvement,
   wherein the threshold means includes a capacitor and includes means for comparing the amount of improvement in the received signal with a predetermined value.

4. A circuit for controlling an operator indicator, according to claim 3, wherein the predetermined value includes a voltage level.

5. In a radio receiver system receiving an input carrier signal, a circuit for controlling an operator indicator, comprising:
   detection means for detecting a preselected improvement in the carrier signal condition of the received signal;
   threshold means, responsive to the detection means, for monitoring the improvement in the carrier signal condition of the received signal; and
   delay means, responsive to the threshold means, for effectively delaying the activation of the operator indicator for a predetermined period of time to prevent a false indication of said improvement,
   wherein the delay means prevents sudden power drains from affecting the circuit.

6. In a radio receiver system receiving an input carrier signal and having a tune detection circuit coupled to a tune indicator, a circuit for controlling the activation of the tune indicator, comprising:
   detection means for detecting a preselected improvement in the carrier signal condition of the received signal;
   status means, responsive to the detection means, for indicating the improvement in the carrier signal condition of the input signal; and
   delay means, responsive to the status means and the tune detection circuit, for activating the tune indicator after a selected period of time to prevent a false indication of said improvement.

7. A circuit for controlling the activation of the tune indicator, according to claim 6, wherein the detection means is an AGC circuit.

8. A circuit for controlling the activation of the tune indicator, according to claim 6, wherein the status means is a capacitor which is charged for the selected period of time to a voltage level which indicates that the tune indicator should be activated.

9. A circuit for controlling the activation of the tune indicator, according to claim 7, wherein the delay means includes a lock detector for detecting if the receiver is out of lock with the input signal, and a clamping circuit, responsive to the lock detector, for clamping the voltage at the capacitor so as to prevent the tune indicator from activating.

10. A circuit for controlling the activation of the tune indicator, according to claim 7, wherein the delay means includes a noise detector for detecting noise on the input signal, and a clamping circuit, responsive to the noise detector, for clamping the voltage at the capacitor.

11. A circuit for controlling the activation of the tune indicator, according to claim 7, wherein the delay means includes means for detecting if the receiver is out of lock with the input signal or if noise is on the input signal, and a clamping circuit, responsive thereto, for clamping the voltage at the capacitor so as to prevent the tune indicator from activating.

12. In an AM stereo radio receiver an AM input signal and having a tune detection circuit, a circuit for controlling a tune indicator and a stereo indicator, comprising:
   detection means for determining that the input signal is a stereo signal and for detecting a preselected improvement in the condition of the received signal;
   status means, responsive to the detection means, for indicating the condition of the input signal;
   driving means, responsive to the status means, for gradually activating the stereo indicator so as to prevent sudden power drains for affecting the circuit; and
   delay means, responsive to the status means and the tune detection circuit, for activating the tune indicator after a selected period of time.

13. A circuit for controlling a tune indicator and a stereo indicator, according to claim 12, wherein the status means is a capacitor which is charged to a first level to represent the selected period of time and charged to a second level to indicate that stereo is present.

14. In an AM stereo radio receiving an AM input signal and having a tune detection circuit, a circuit for controlling a tune indicator and a stereo indicator, comprising:
   a capacitor and a limited current supply for charging the capacitor;
   detection means for determining that the input signal is a stereo signal and for detecting a preselected improvement in the condition of the received signal;
   discharge means, responsive to the detection means, for discharging the capacitor;
   driving means, responsive to the charge on the capacitor, for gradually activating the stereo indicator so as to prevent sudden power drains from affecting the circuit; and
   delay means, responsive to the tune detection circuit and the charge on the capacitor, for activating the tune indicator after a selected period of time.

15. A circuit for controlling a tune, indicator and a stereo indicator, according to claim 14, wherein discharge means includes means for clamping the charge level at the capacitor.

16. A circuit for controlling a tune indicator and a stereo indicator, according to claim 14, wherein the tune indicator and the stereo indicator comprise a single LED with two brightness levels.

* * * * *

UNITED STATES PATENT AND TRADEMARK OFFICE
CERTIFICATE OF CORRECTION

PATENT NO. : 4,944,011

DATED : 07/24/90

INVENTOR(S) : Lawrence M. Ecklund

It is certified that error appears in the above-identified patent and that said Letters Patent is hereby corrected as shown below:

At column 5, line 23, insert after "signal;" --and--.

At column 6, line 21, "receiver" should be --receiving--.

At column 6, line 60, delete after "tune" ",".

Signed and Sealed this

Second Day of June, 1992

Attest:

DOUGLAS B. COMER

*Attesting Officer*     *Acting Commissioner of Patents and Trademarks*